(12) United States Patent
Lowe et al.

(10) Patent No.: US 9,893,521 B2
(45) Date of Patent: Feb. 13, 2018

(54) DIGITAL POWER NETWORK METHOD AND APPARATUS

(71) Applicant: VoltServer, Inc., Charlestown, RI (US)

(72) Inventors: Harry Daniel Lowe, Providence, RI (US); Stephen Spencer Eaves, Charlestown, RI (US)

(73) Assignee: VoltServer, Inc., East Greenwich, RI (US)

( * ) Notice: Subject to any disclaimer, the term of this patent is extended or adjusted under 35 U.S.C. 154(b) by 476 days.

(21) Appl. No.: 14/599,003

(22) Filed: Jan. 16, 2015

(65) Prior Publication Data

US 2015/0207318 A1 Jul. 23, 2015

Related U.S. Application Data

(60) Provisional application No. 61/929,074, filed on Jan. 19, 2014.

(51) Int. Cl.
*H04L 12/10* (2006.01)
*H04B 3/54* (2006.01)
(Continued)

(52) U.S. Cl.
CPC ............... *H02J 1/08* (2013.01); *G06F 1/266* (2013.01); *G06F 1/28* (2013.01); *G06F 1/3287* (2013.01);
(Continued)

(58) Field of Classification Search
CPC .......... G06F 1/266; G06F 1/28; G06F 1/3287; Y02B 60/1278; Y02B 60/1282; H04L 12/10; H04B 3/548
See application file for complete search history.

(56) References Cited

U.S. PATENT DOCUMENTS 8,781,637 B2 7/2014 Eaves
9,373,965 B2 * 6/2016 Liu ........................ H02J 3/38
(Continued)

FOREIGN PATENT DOCUMENTS

WO 2013/013282 A1 1/2013

OTHER PUBLICATIONS

Takuno, Tsuguhiro, Megumi Koyama, and Takashi Hikihara. "In-home power distribution systems by circuit switching and power packet dispatching." Smart Grid Communications (SmartGridComm), 2010 First IEEE International Conference on, pp. 427-430. IEEE, 2010.*
US Patent and Trademark Office, International Search Report and Written Opinion for PCT/US15/11770 (corresponding PCT application) (dated Apr. 10, 2015).

*Primary Examiner* — Ryan Johnson
(74) *Attorney, Agent, or Firm* — Modern Times Legal; Robert J. Sayre

(57) ABSTRACT

A digital power network comprises at least one digital electric power routing device that includes (a) at least one DC power bus; (b) at least two power control elements, each with at least two sets of power terminals, at least one of which accommodates electrical power in packet energy transfer format, and wherein each power control element has electrical connections that allow one set of power terminals to be connected to the DC power bus; and (c) at least one network controller operable to execute control functions within the power control elements to route electrical power from at least one power control element to at least one other power control element within the digital power network. The digital power network further includes at least one power source and at least one load.

6 Claims, 1 Drawing Sheet

(51) Int. Cl.
*G06F 1/26* (2006.01)
*G06F 1/28* (2006.01)
*H02J 1/08* (2006.01)
*G06F 1/32* (2006.01)
*H02M 3/02* (2006.01)
*H02J 13/00* (2006.01)
*H02J 7/35* (2006.01)

(52) U.S. Cl.
CPC .......... *H02J 13/0003* (2013.01); *H02M 3/02* (2013.01); *H04B 3/548* (2013.01); *H04L 12/10* (2013.01); *H02J 7/35* (2013.01); *Y02B 60/1282* (2013.01); *Y02E 40/72* (2013.01); *Y02P 90/50* (2015.11); *Y04S 10/123* (2013.01); *Y10T 307/352* (2015.04)

(56) References Cited

U.S. PATENT DOCUMENTS

| | | | |
|---|---|---|---|
| 2009/0193268 A1* | 7/2009 | Kreiner | G06F 1/266 713/300 |
| 2011/0019560 A1 | 1/2011 | Karaoguz et al. | |
| 2012/0075759 A1* | 3/2012 | Eaves | H02H 3/40 361/86 |
| 2012/0185708 A1* | 7/2012 | Rekimoto | G06F 1/266 713/310 |
| 2014/0013146 A1 | 1/2014 | Kreiner et al. | |
| 2016/0094029 A1* | 3/2016 | Hikihara | H02J 1/10 307/29 |
| 2016/0134109 A1* | 5/2016 | Kogo | H02J 3/46 307/24 |

\* cited by examiner

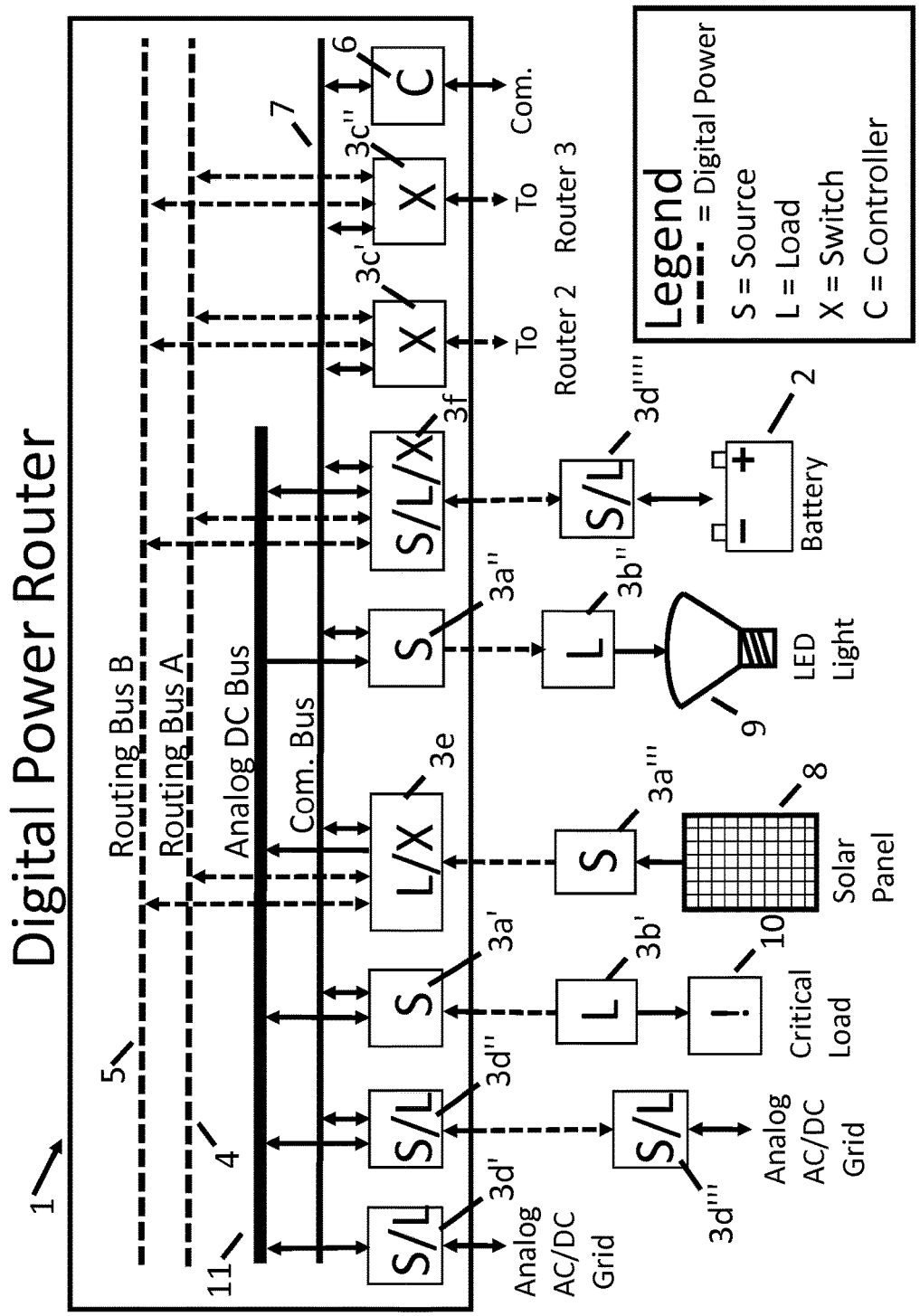

DIGITAL POWER NETWORK METHOD AND APPARATUS

RELATED APPLICATION

This application claims the benefit of U.S. Provisional Application No. 61/929,074, filed 19 Jan. 2014, the entire content of which is incorporated herein by reference.

BACKGROUND

A representative digital electric power distribution system using PET protocol is described in U.S. Pat. No. 8,781,637 (Eaves 2012).

The primary discerning factor in a digital power transmission system compared to traditional, analog power systems is that the electrical energy is separated into discrete units, and individual units of energy can be associated with analog and/or digital information that can be used for the purposes of optimizing safety, efficiency, resiliency, control or routing.

As described by Eaves 2012, a source controller and a load controller are connected by power distribution conductors. The source controller of Eaves 2012 periodically isolates (disconnects) the power distribution conductors from the power source and analyzes, at a minimum, the voltage characteristics present at the source controller terminals directly before and after the conductors are isolated. The rate of rise and decay of the voltage on the conductors reveal if a fault condition is present on the power distribution system conductors. Measurable faults include, but are not limited to, short circuit, high line resistance or the presence of an individual who has improperly come in contact with the conductors. Eaves 2012 also describes digital information that may be sent between the source and load controllers over the power distribution conductors to further enhance safety or provide general characteristics of the energy transfer such as total energy, or the voltage at the load controller terminals. Since the energy in a PET system is transferred as discrete quantities, or quanta, it can be referred to as "digital power".

Where Eaves 2012 focused on power transfer from a single source to a load device, the discussion that follows describes how digital power network elements that include multiple loads, sources, energy storage devices and other conventional power grids can be optimally coordinated to form a digital power network. The disclosed digital power network architecture provides a platform for safe, resilient, and efficient transfer of power and adds priority structures that optimizes these attributes.

SUMMARY

Digital power networks and methods for routing digital electric power among power control elements are described herein, where various embodiments of the apparatus and methods may include some or all of the elements, features and steps described below.

A digital power network comprises at least one digital electric power routing device for facilitating the routing of power among power control elements. The digital electric power routing device comprises (a) at least one DC power bus; (b) at least two power control elements, each with at least two sets of power terminals, wherein at least one of the sets of power terminals accommodates electrical power in packet energy transfer format, and wherein each power control element has electrical connections (e.g., wire and/or an electronic switch that selectively connects the terminals to the DC power bus) configured to allow one set of its power terminals to be connected to the DC power bus; and (c) at least one network controller operable to execute control functions within the network power control elements to route electrical power from at least one power control element to at least one other power control element within the digital power network. The digital power network further includes at least one power source coupled with at least one of the power control elements and at least one load coupled with at least one of the power control elements.

In particular embodiments, the network controller functionality resides in one of the network power control elements. In additional embodiments, the digital power router includes at least one digital power bus separate from the DC bus, where the digital power bus facilitates the direct routing of power in packet energy transfer format from one power control element to at least one another power control element.

In particular embodiments, the controller executes an algorithm that assigns a weighting value to each option for routing power from one power control element to another power control element allowing routing decisions to be optimized based on attributes of safety, resiliency and efficiency. In additional embodiments, the network controller resides in a first digital electric power routing device exchanges routing information with a network controller residing in a second digital electric power routing device, allowing routing decisions among network power control elements connected to the first digital electric power routing device to be made by the network controller that resides in the second digital electric power routing device.

In particular embodiments, a first power control element is connected to the digital power bus of a first digital power router and provides power in packet energy transfer format to a second power control element connected to the same digital power bus in the same digital power router, and the second power control element directs the digital power to a third power control element that is connected to a second digital power router.

BRIEF DESCRIPTION OF THE DRAWINGS

The FIGURE schematically illustrates a digital power network, as described herein.

In the accompanying drawings, like reference characters refer to the same or similar parts throughout the different views; and apostrophes are used to differentiate multiple instances of the same or similar items sharing the same reference numeral. The drawings are not necessarily to scale; instead, emphasis is placed upon illustrating particular principles in the exemplifications discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

A primary component of the disclosed digital power network, shown in the FIGURE, is a digital power router (also referred to as a routing device) 1. The router 1 services a number of power control elements 3a-3f. An exemplary source/load power control element 3d'''' is shown in the FIGURE servicing an energy storage device, in this case a battery 2. Other power control elements 3a'''/3b'' can service a solar panel 8, which is an energy source, or an LED light 9, which is a load. Power control elements may have different levels of importance within a digital power network. For example, power control element 3b' servicing a critical load 10, such as a medical respiration device or a cellular radio that carries emergency (911) service, are assigned a higher priority than other elements. The system is not limited to the described source, load and energy storage device examples, since they represent just a small subset of a myriad of what is available for interfacing to the digital power network.

The power control elements 3a-3f perform one or more of the following functions:
  verify the safe transfer of energy under packet energy transfer (PET) protocol;
  convert from analog power to digital power under PET protocol, or vice versa;
  convert and/or control voltage and/or current; and
  switch power from one channel to another channel within the network.

The power control elements each include power terminals. At least one set of the power terminals can accommodate electrical power in packet energy transfer format via electronics internal to the power control element that converts the power from packet energy transfer format back to conventional DC power. The exception is a power control element designed as a digital power switch, that directs power in existing packet energy transfer format to another power control element without converting the power back to conventional DC power.

Whenever functions involve digital power transfer, the PET protocol is continuously executed and verified to ensure safety. In the FIGURE, shown in the drawing legend and within the depicted element functional blocks, the power control elements 3a-3f are labeled according to their functionality as S for source 3a, L for load 3b, X for switch 3c. Power control elements with combined functions include combined source/load elements 3d, a combined load/switch element 3e, and a combined source/load/switch element 3f.

A network controller element 6, labeled C, provides commands, executes supervisory algorithms and receives data from other processing devices that may reside within the power control elements 3a-f or within network controller elements in other external routers. In one embodiment, the network controller comprises a microprocessor that communicates to the power control elements within the digital power router over communication bus 7 resident in the digital power router.

Referring to the FIGURE, source elements 3a are performing source (S) related functions. More specifically to this example, source element 3a''' is converting analog DC power from a solar panel 8 to a higher DC analog voltage and then converting that analog voltage to digital power in PET format. Any of various power converter architectures, well known to those skilled in the art, can be used to convert the lower voltage of the solar panel 8 to higher voltage. Representative voltages, but not to limit the scope of this invention, can be 36-48 Vdc for the operating voltage of a solar panel and 300-400 Vdc for the amplitude of the PET digital power. The method that the power control element employs to convert to PET format is described in Eaves 2012.

Power control elements 3b are acting as load elements, L, converting the PET digital power, using the methods of Eaves 2012, back to the analog DC voltage level used within the digital power router 1. The digital power router internal DC voltage would typically, but not to limit the scope of this invention, have a level of 300-400 Vdc.

Power control element 3e includes a switching (X) as well as load (L) functionality that is useful when servicing an energy source (in this example, a solar panel 8). Using the switching function, power control element 3e can avoid the conversion from digital power to analog power and instead route the digital power directly to another element that also has switching functionality rather than converting the digital power to the analog DC internal to the router 1 on analog DC bus 11. For example, power control element 3e can switch the power to routing bus 4 to be further routed to power control element 3f that has source/load/switch functionality. Power control element 3f then transfers digital power to a source/load element 3d''''. Source/load power control element 3d'''' then converts the digital power to the appropriate analog power level necessary to charge battery 2. By having power control elements 3e and 3f perform switching functions rather than conversion, there is less losses and therefore more efficiency in the transfer.

Decisions on switching and routing are administered by the network controller 6. However, it should be noted that another instance of network controller 6 outside the router 1, may also make decisions, particularly since the routing of power may involve sending digital power to an entirely different digital power routing unit as is illustrated by the connection to the switching element 3c' that can route digital power to a second power router. Additional internal routing bus 5 is shown to allow multiple routing paths and connections to be made simultaneously. There may be more than two internal routing buses installed according to the needs of the application.

Decision Making:

The system allows for decisions on the conversion and routing of power to be made on the basis of optimizing safety, resiliency and efficiency of power transfer. There are additional considerations to be made based on the priority assigned to the power control elements (e.g., sources and loads); such as providing more priority to a medical life support device 10 versus general lighting 9.

The information on the available power control elements in the system, their status and instructions for routing are managed by a routing table; a tool that is well known to those skilled in the industry of present-day data routers (such as an Ethernet router used in a home or data center).

The routing table includes the ability to assign a "cost" to various routing decisions. In the previous example, the power in digital PET format from a solar panel 8 was routed directly to a battery 2 rather than being converted back to analog power inside the digital power router 1 first, thus saving conversion losses and improving efficiency. This decision is made by assigning a cost variable to the switching action that penalizes the conversion decision more than the alternative switch and route decision. However, if the battery 2 was fully charged and no longer able to accept energy, then the cost variable would be updated and the decision changed to route the power from the solar panel 8 to another location or convert the power to the internal analog DC power used by the digital power router 1. The routing table can also include routing costs for sending power through to a second digital power router that has communicated its cost variables to the first router 1 utilizing the external communication link 11 shown attached to controller 6. Like-wise, the first digital power router 1 communicates its cost variable to other connected digital power routers and may receive as well as send power to/from the routers.

As described in the routing cost example, above, external power control elements, such as the one servicing the battery, may need to communicate their status to the digital power router 1. In the example of the battery 2, it was necessary to have a status variable indicative of the state of charge of the battery 2. Communication between a power control element inside the digital power router 1 and a power control element outside the digital power router 1 can be performed with the same conductors as are used for transmitting power using in-line modulation techniques described in Eaves 2012, or via external wired or wireless communication between the power control element and the digital power router controller 6. Communications are also useful to allow "plug-and-play" set-up of the digital power network where the power control element can communicate data that can include an identification code, status, characteristics and capabilities. However, even without automatic configuration, the digital power routing table would allow for manual configuration of power control elements using an operator or factory configuration interface.

Communication capability among the digital power router controller 6 and power control elements also allow dynamic updates of a change in network element type or status and allow a change to network element functionality, such as changing from performing a source function versus a load or switch function.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for routing digital electric power among power control elements, the method comprising:
   routing digital electric power with at least one digital electric power routing device among a plurality of power control elements, each power control element having at least two sets of power terminals, and the digital electric power routing device including (a) at least one DC power bus; (b) at least two of the power control elements, wherein at least one power terminal of each power control element is connected to the DC power bus; and (c) at least one network controller;
   transmitting electrical power in packet energy transfer format with at least one of the sets of power terminals;
   executing control functions using the network controller within the power control elements to determine routing of electrical power and to route electrical power from at least one power control element to at least one other power control element within a digital power network;
   electrically isolating the power terminals; and
   analyzing voltage characteristics at the power terminals before and after the power terminals are electrically isolated to evaluate whether a fault condition exists.

2. The method of claim 1, wherein the network controller functionality resides in one of the power control elements.

3. The method of claim 1, wherein the digital electric power routing device includes at least one digital power bus separate from the DC bus, the method further comprising directly routing power in packet energy transfer format using the digital power bus from one power control element to at least one other power control element.

4. The method of claim 3, wherein the power control elements include a first power control element and a second power control element, both connected to the digital power bus of a first digital power router, the method further comprising:
   using the first power control element to provide power in packet energy transfer format to the second power control element; and
   using the second power control element to direct the digital power to a third power control element that is connected to a second digital power router.

5. The method of claim 1, further comprising using the network controller to execute an algorithm that assigns a weighting value to each option for routing power from one power control element to another power control element, optimizing routing decisions based on attributes of safety, resiliency and efficiency.

6. The method of claim 1, wherein the network controller residing in a first digital electric power routing device exchanges routing information with a second network controller residing in a second digital electric power routing device, allowing routing decisions among network power control elements connected to the first digital electric power routing device to be made by the second network controller that resides in the second digital electric power routing device.

* * * * *